//

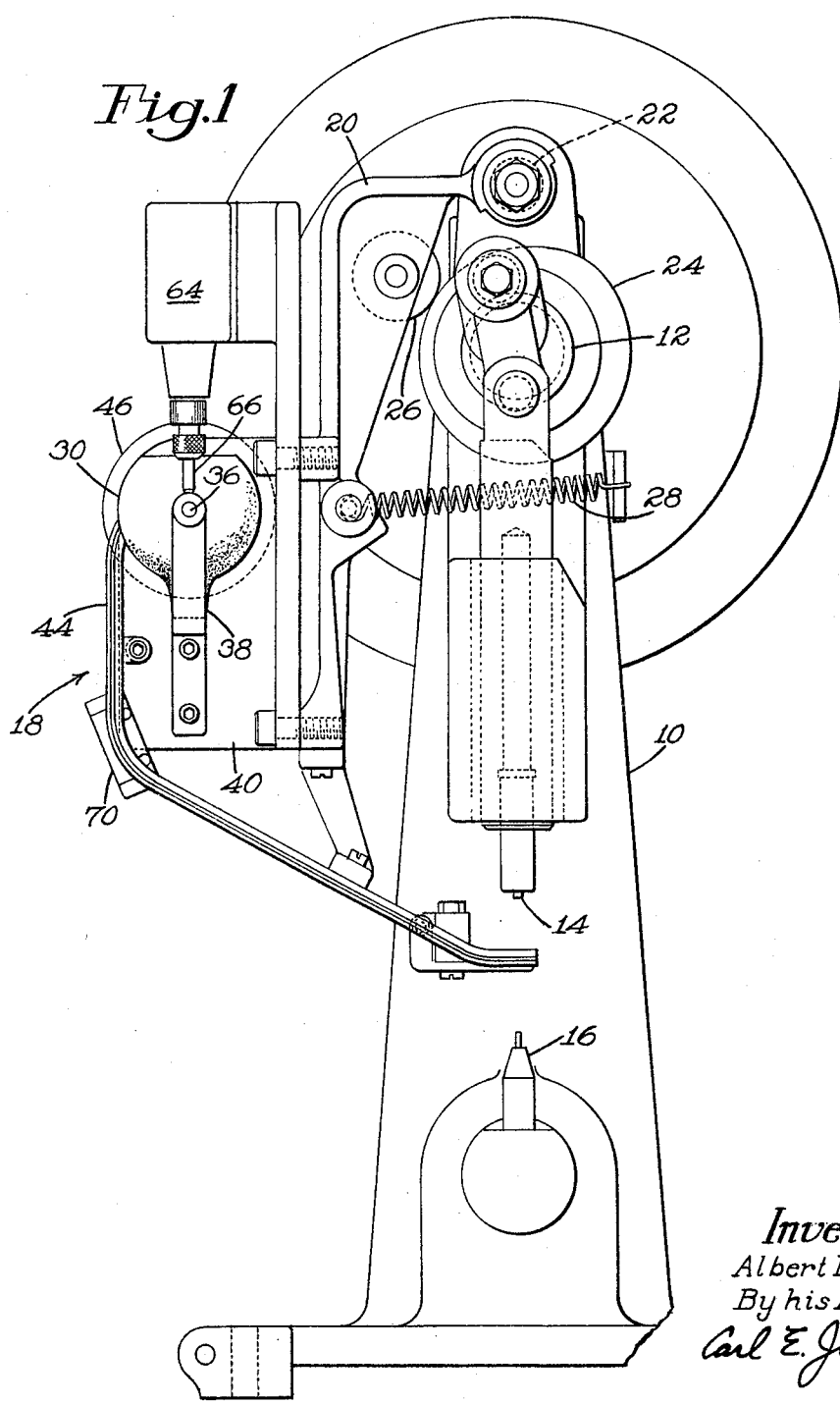

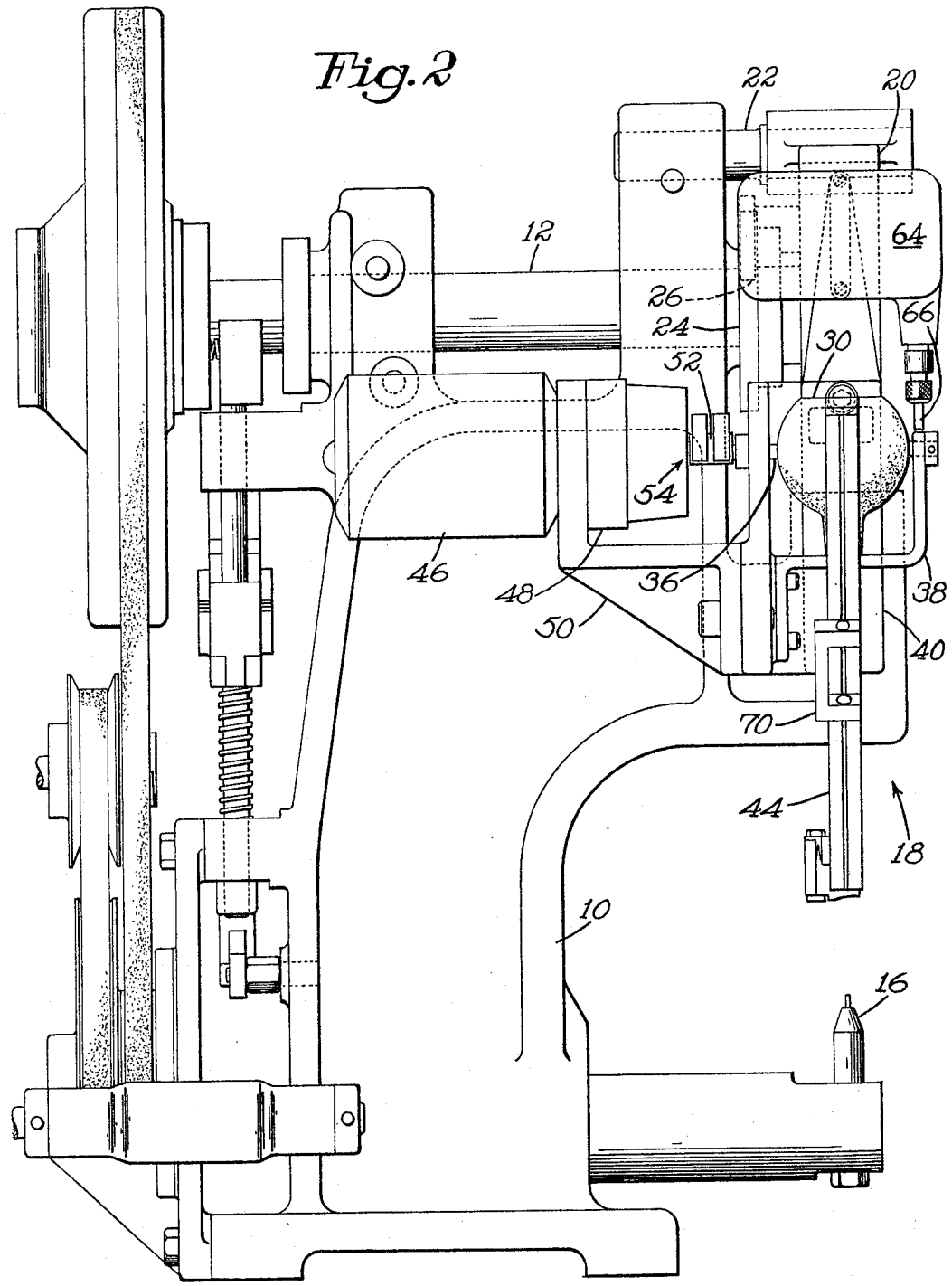

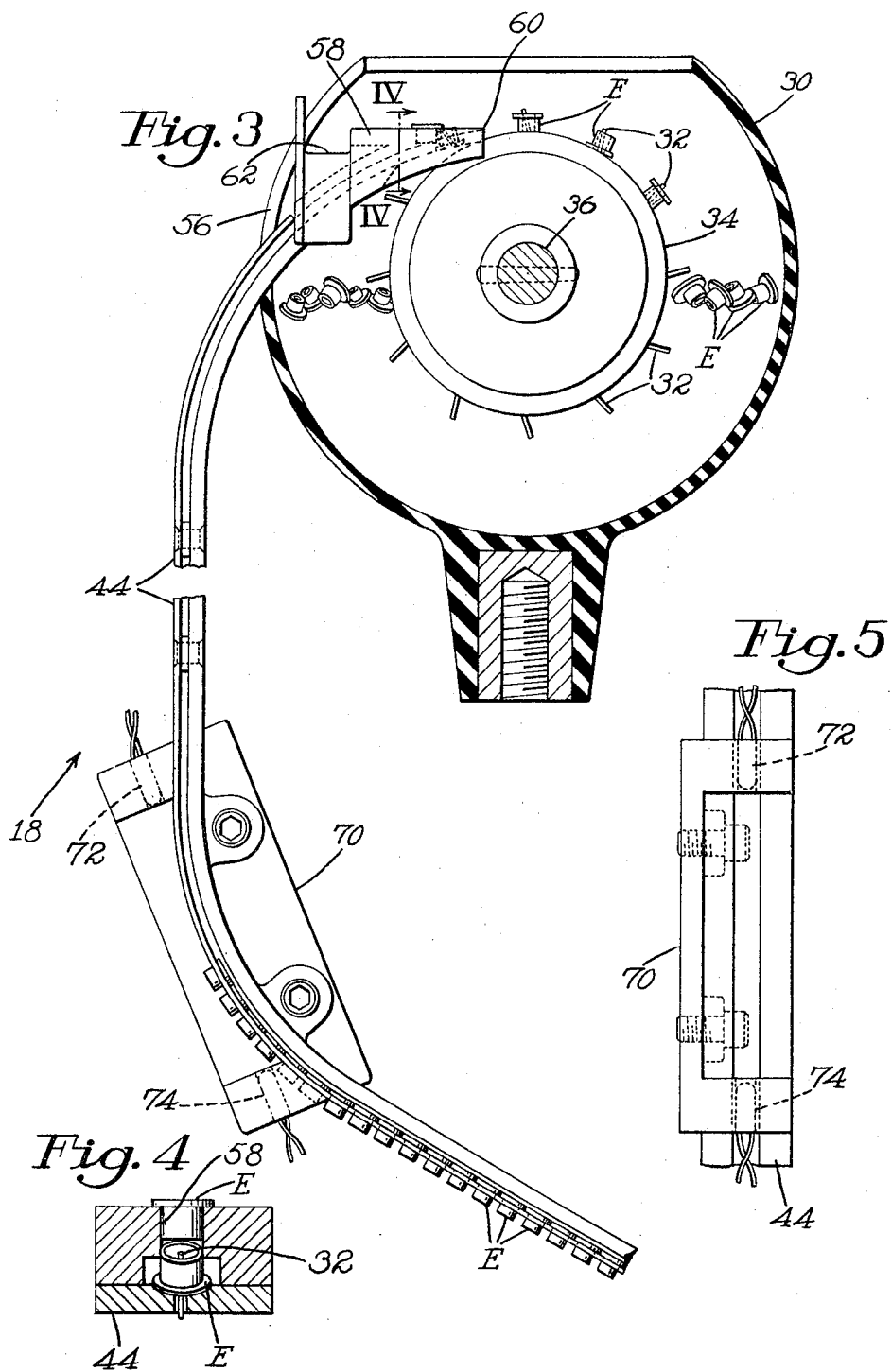

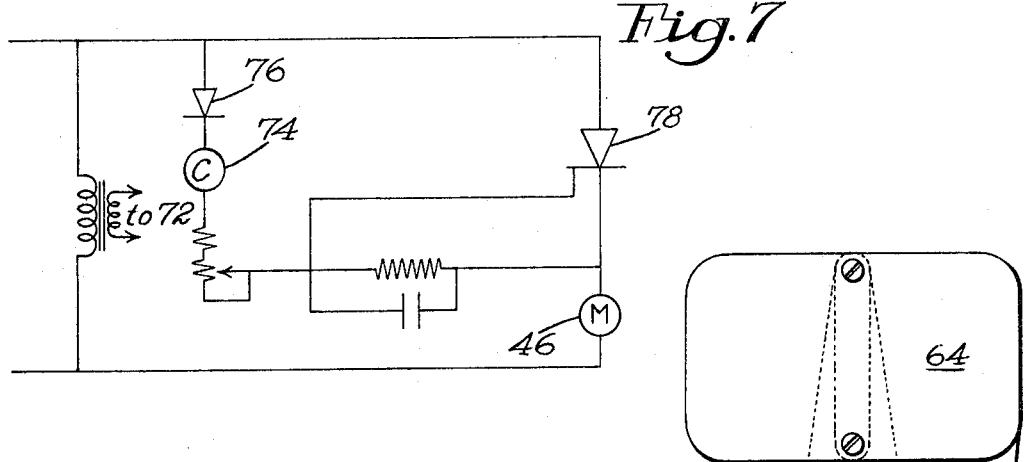
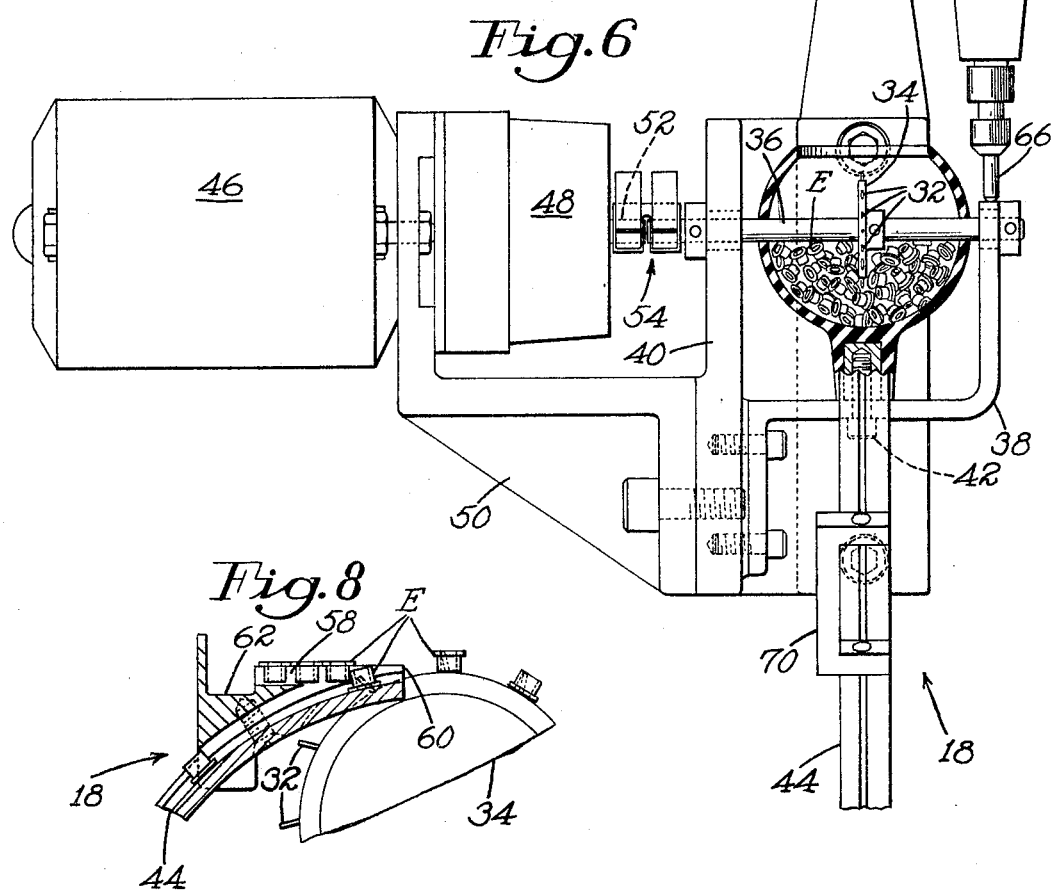
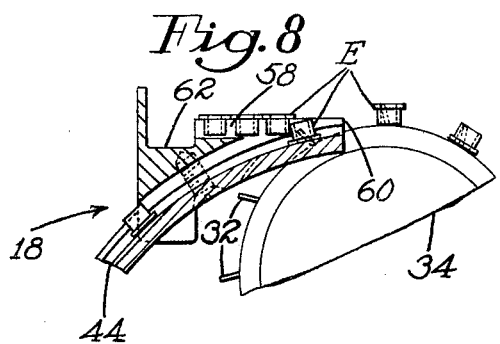

United States Patent Office 3,268,114
Patented August 23, 1966

3,268,114
MECHANISM FOR FEEDING SMALL
TUBULAR ARTICLES
Albert E. Newton, Beverly, Mass., assignor to United
Shoe Machinery Corporation, Boston, Mass., a corporation of New Jersey
Filed Oct. 8, 1964, Ser. No. 402,457
7 Claims. (Cl. 221—13)

This invention relates to means for feeding tubular articles, especially small fasteners such as miniature eyelets. More particularly the invention is concerned with providing improved, economical mechanism for reliably delivering successive small eyelets of the type often used in electrical work, in uniformly oriented conditions from a source of supply to the operating tools of an inserting machine. While the invention is accordingly thus illustrated herein, it will be appreciated that in its various aspects the invention is not necessarily thus limited.

Large quantities of very small eyelets are used in assembling electrical parts and as electrical conductors. Because of their tiny size (on the order of .059 inch barrel diameter with flange diameter .105 inch, and length of .0625"), it is difficult mechanically to attain continuous, precise, and reliable control of their positioning for effecting rapid consecutive installations. The problem is aggravated by the strong tendency of the fasteners to bridge, become cocked, and easily jam thereby preventing continuous flow. Also, it is desirable to avoid excessive tumbling of the fasteners to be fed, and to overcome their tendency not to slide in a raceway when impeded by minute irregularities occurring in the eyelets themselves or in the raceway, or by foreign particles such as grit and dust.

With the foregoing considerations in view, it is an object of this invention to provide an efficient and reliable tubular article separating and feeding mechanism for supplying especially the smaller diameter articles from a container and delivering them consecutively in uniformly oriented condition.

In keeping with this object, and in accordance with a feature of the invention, there is provided in combination a container or reservoir for a supply of tubular fasteners respectively having dissimilar ends, a raceway having an inclined track and an upper portion extending into the upper portion of the reservoir, the upper raceway portion being formed with spaced passages respectively adapted for receiving fasteners oriented and not oriented for accommodation in the inclined track, and a plurality of movable, spaced projections aligned with the passages and respectively receivable by the fasteners to deliver the latter, according to the orientation of their ends on the projections, into the raceway passages. As herein shown eyelet feeding mechanism embodying the invention includes an inverting raceway and is mounted for delivering eyelets flanged-end up, to the set tools of an eyelet inserting machine. Accordingly, the passage communicating with the inclined raceway track receives eyelets flanged-ends down, the other or reject passage receiving eyelets with their flanges up to be returned to the reservoir.

In accordance with a further feature of the invention the projections or pick-up pins are peripherally mounted on a rotary wheel preferably at an angle to its radii intersecting the pins, and the reservoir has at least its lower portion of deformable material such as rubber to enable the respective pins to receive and carry one eyelet barrel, any bridging or stacking tendency on the part of other eyelets between the carried eyelet and the reservoir wall being overcome by deflection of the wall.

Yet another feature of the invention consists in the combination, with an inclined raceway and power means for separating and supplying successive fasteners to the receiving end of the raceway, of electrical detection means for automatically actuating the power means when the level of fasteners in the raceway is less than desired and deenergizing the power means when the raceway fasteners are at a desired level.

The above and other features of the invention, together with novel combinations of parts, will now be more particularly described with reference to the accompanying drawings, in which:

FIG. 1 is a view in front elevation of an eyelet inserting machine having novel eyelet separating and feeding mechanism in accordance with this invention;

FIG. 2 is a view in side elevation of the machine of FIG. 1;

FIG. 3 is an enlarged view, partly in section, of the eyelet reservoir, feed mechanism and level sensing mechanism shown in FIG. 1;

FIG. 4 is a section taken on the line IV—IV of FIG. 3;

FIG. 5 is a detail view in side elevation of the eyelet sensing control shown in FIG. 3;

FIG. 6 is a view corresponding to FIG. 2, but with the feed mechanism enlarged and partly in section;

FIG. 7 is a circuit diagram of the automatic control for the feed mechanism; and FIG. 8 is a section taken longitudinally of the upper portion of the raceway.

Since the illustrative eyeleting machine is otherwise of conventional construction, only so much thereof as is necessary to the understanding of this invention will now be described.

Referring to FIGS. 1 and 2, a main frame 10 rotatably supports a horizontal shaft 12 and mechanism operated thereby for vertically reciprocating an inserting tool 14 with respect to an anvil 16. Feeding mechanism including a raceway generally designated 18 about to be explained is herein shown as carried by a bracket 20 which is suspended for oscillation about a horizontal pin 22 secured in the frame 10. It will accordingly be understood that for each inserting stroke of the tool 14, a cam 24 on the shaft 12 cooperating with a roll 26 carried by the bracket 20 is effective to swing the lower or delivery end of the raceway 18 into position to transfer an endmost eyelet E (not shown) to the inserting tool 14. To this end a tension spring 28 connecting the bracket 20 and the main frame maintains engagement of the roll 26 and the cam 24.

The mechanism for insuring a continuous availability of flange-up eyelets E (FIGS. 3, 4, 6, 8) in the raceway 18 to meet the operating rate of the machine comprises a container 30 (FIGS. 1, 2, 3 and 6) preferably having at least its lower wall of yieldable or deformable material, for instance rubber, for holding the eyelets to be installed, and a plurality of spaced carriers in the form of projections termed pick-up pins 32 (FIGS. 3, 6, 8) movable into and out of a mass of eyelets E in the container to deliver them singly into the vertically slotted mouth at the upper end of the raceway. The pick-up pins 32 are preferably circumferentially spaced in a common plane on the periphery of a wheel 34 (FIGS. 3, 6 and 8) rotatably carried by a shaft 36 extending horizontally through the container and journaled in connected supports 38 and 40 mounted on the bracket 20. The base of the container 30 is threadedly formed to receive a screw 42 (FIG. 6) for affixing the container on the support 38. As shown in FIGS. 3 and 8 the pins 32 project from the wheel 34 by an amount substantially equal to the barrel length of the eyelets to be set. It also is preferable that the pins extend outwardly at an angle to the wheel radii intersecting them and slightly forwardly in the direction of rotation. This arrangement assists in retention of an eyelet captured by a pin as the latter is moved through the eyelet supply.

For causing the wheel 34 to rotate counterclockwise as seen in FIG. 3, the shaft 36 is preferably frictionally driven (usually under 100 r.p.m.) but, as later explained, only as additional eyelets are needed to maintain a suitable supply level in a main, inclined track 44 of the raceway 18. To this end a motor 46 (FIG. 6) and its reducer 48, preferably of the harmonic drive type, are carried by an angular member 50 secured to the support 40, and an output shaft 52 of the reducer is fitted with a spring clip type of friction drive flexible coupling generally designated 54 secured to the shaft 36.

It has been found that as each pick-up pin 32 emerges from the eyelet supply, there is considerably better than a 50–50 chance it will have captured an eyelet either flange up or flange down. In this case, in order to return flange-up eyelets to the container 30 and deliver flange-down eyelets into the raceway track 44 for inverting end for end, the upper portion of the raceway 18 extends through a slot 56 (FIG. 3) in the container wall and has a horizontal reject passageway 58 (FIGS. 3, 4 and 8) above the track 44. The mouths of the latter and of the reject passageway 58 are thus alined with the path of the pins 32 as they arrive and relinquish their fasteners. As herein shown the track 44 is substantially tangent to the upper portion of the periphery of the wheel 34, an advance lip 60 of the reject passageway 58 being spaced radially from the upper portion of the periphery to intercept the flanges of captured flange-up eyelets and conduct them, under the urging of successive captured eyelets, via a return chute portion 62 (FIGS. 3, 8) of the passageway 58 to the container.

It happens occasionally, oftener with certain shapes of tubular articles to be fed than others, that they will telescope and catch on or in one another. Sometimes, too, they may tend to cling crosswise to the wheel perimeter adjacent to a pin-captured article. To insure that only properly oriented articles will be received in the mouths of the main track 44 or of the reject passageway 58, and further to aid in causing continuous pick-up, unjamming, and flow of articles such as eyelets, an independently energized vibrator 64 (FIGS. 1, 2 and 6) may be carried by the bracket 20 and arranged to exert a quivering effect through an arm 66, for instance to the outboard bearing end of the shaft 36.

The eyelet separating "pin wheel" 34 desirably operates slowly so as not to unduly agitate the eyelets to be delivered, yet it must supply them to the main track 44 at a rate at least equal to that at which they are being installed by the machine. Since it is undesirable for the supply of eyelets in the track 44 to accumulate to a point where they could block delivery thereto by the pins 32, an automatic eyelet level and motor control is employed. It consists of a unit 70 (FIGS. 1, 3 and 5) preferably secured to an elbow of the raceway about half way of the track 44. This unit 70 includes a lamp 72 for directing a light beam into the path of the eyelet cross-wise of their barrels, and a photocell 74 (FIGS. 3, 5 and 7) responsive to the beam when it is not blocked by one or more of the eyelets in the track 44. Referring to FIG. 7, a control circuit connected to a suitable A.C. voltage source includes a diode 76 providing D.C. current to the cell 74 which is arranged through a speed control potentiometer to control operation of the motor 46. Thus a gate type silicon controlled rectifier 78 in the control circuit is connected via its cathode to the motor 46 and, when eyelet level fails to block the light beam in the detector 70, the gate of the rectifier 78 is triggered to energize the motor and thereby raise the eyelet raceway level to the beam blocking point in the raceway elbow. But when this level is attained the light beam is intercepted, the photocell 74 no longer serves as a conductor, and the motor 76 is stopped until the raceway eyelet level descends below the elbow.

Operation of the feed mechanism will be briefly reviewed. Assuming the container 30 has been loaded, the tool 14 will install an endmost eyelet E from the raceway track 44 in each downward stroke. If the eyelet level in the track falls below the beam blocking level shown in FIG. 3 by only one or two eyelets, the incidence of light upon the cell 74 triggers the rectifier 78 to restart the motor 46. Consequently the pins 32 will rotate in their general plane to pick up and deposit eyelets with their flange ends up in the reject passage 58, and with flanges down in the track 44. The latter carries the eyelets and inverts them for successive delivery to the tool 14.

If in the course of eyelet pick up the eyelets telescope and build up rigidly between a pin 32 and the container wall, yieldability of the latter avoids jamming and enables the pin to continue its eyelet carrying movement.

Experience has shown that more than 50% of the eyelets picked up by the pins 32 are flanged end down for successful insertion into the mouth of the track 44, the remainder being returned to the bottom of the container by action of the vibrator 64 or the reject chute 62. By the time each pin 32 has rotated sufficiently to withdraw from an eyelet barrel properly oriented, it has come under the control of the track 44 of the passageway 58.

It will be understood that if the fastener inserting machine is of the gang type, a plurality of raceways may be employed and supplied by a corresponding plurality of series of pick-up pins spaced axially on a rotary cylinder.

Having thus described my invention, what I claim as new and desire to secure by Letters Patent of the United States is:

1. Mechanism for feeding tubular fasteners comprising a container, fastener separating means located in the container and including a series of spaced pins movable through a closed path to capture fasteners singly thereon and elevate them for delivery, a raceway having a main track extending into and terminating in the upper portion of the container adjacent the top of the delivery means, a reject lip mounted above said main track and spaced from said delivery means substantially at the termination of said track, said lip being disposed to deflect fasteners not oriented in the desired position from the separator means for return to the container, said raceway main track having a fastener receiving mouth between said lip and said delivery means shaped and disposed to receive fasteners which are uniformly oriented in the desired position.

2. Mechanism as set forth in claim 1 and further characterized in that said separating means includes a rotary wheel peripherally supporting said pins, the latter being substantially of the same length as the fasteners and biased in the direction of rotation to aid fastener retention thereon.

3. Mechanism as set forth in claim 1 wherein at least the lower wall of the container is deflectible to enable a fastener captured by a pin passing through uncaptured fasteners to avoid jamming.

4. Mechanism for feeding eyelets having one end thereof preformed with a flange, comprising a container for holding a supply of eyelets to be fed, a raceway having a main track the upper portion of which extends into the upper portion of the container, said upper portion of the main track having a slotted mouth for receiving eyelets with their flanges uniformly positioned in one direction and a reject passageway alined with the mouth for receiving eyelets having their flanges uniformly positioned in the opposite direction, and eyelet separating means in the container including pick-up pins movable through the eyelet supply to carry eyelets successively into the main track mouth or said reject passageway according to endwise orientation of each eyelet on its carrying pin.

5. Mechanism according to claim 4 wherein the eyelet separating means is a rotary wheel the periphery of which radially supports said pins in spaced relation for delivery movement substantially in a plane and tangential to said mouth and reject passageway whereby the eyelets are stripped from their pins, the eyelets in the mouth and passageway being further urged therealong by succeeding pin-carried eyelets.

6. Mechanism according to claim 4 and further characterized in that a power means for operating the eyelet separating means is provided, and a detection means responsive to a selected supply level of eyelets in the raceway is operatively connected to the power means, the arrangement being such that a level of the raceway eyelets below the supply level selected automatically actuates the power means, and a supply level of the raceway eyelets above or corresponding to the selected level deenergizes the power means.

7. Mechanism according to claim 6 wherein the detection means is mounted at an elbow of the raceway, the detection means including a light source and a photocell responsive thereto respectively arranged on opposite sides of the raceway elbow whereby the eyelet separating means is operated to restore the eyelet level to that of the elbow on departure therefrom.

References Cited by the Examiner
UNITED STATES PATENTS

| | | | |
|---|---|---|---|
| 1,358,044 | 11/1920 | Williams | 221—168 |
| 2,571,576 | 10/1951 | Hopkins et al. | 221—10 |
| 2,661,866 | 12/1953 | Lubbert et al. | 221—166 |
| 2,803,377 | 8/1957 | Wilson | 221—13 |
| 2,889,960 | 6/1959 | Brancato et al. | 221—166 |
| 3,057,514 | 10/1962 | Dixon | 221—179 |
| 3,061,145 | 10/1962 | Sharpe | 221—166 |
| 3,168,186 | 2/1965 | Young | 221—166 |

ROBERT B. REEVES, *Primary Examiner.*

WALTER SOBIN, *Examiner.*